March 21, 1933. W. H. EVANS 1,902,062
EXPANSION REAMER
Filed Nov. 29, 1929 2 Sheets-Sheet 1
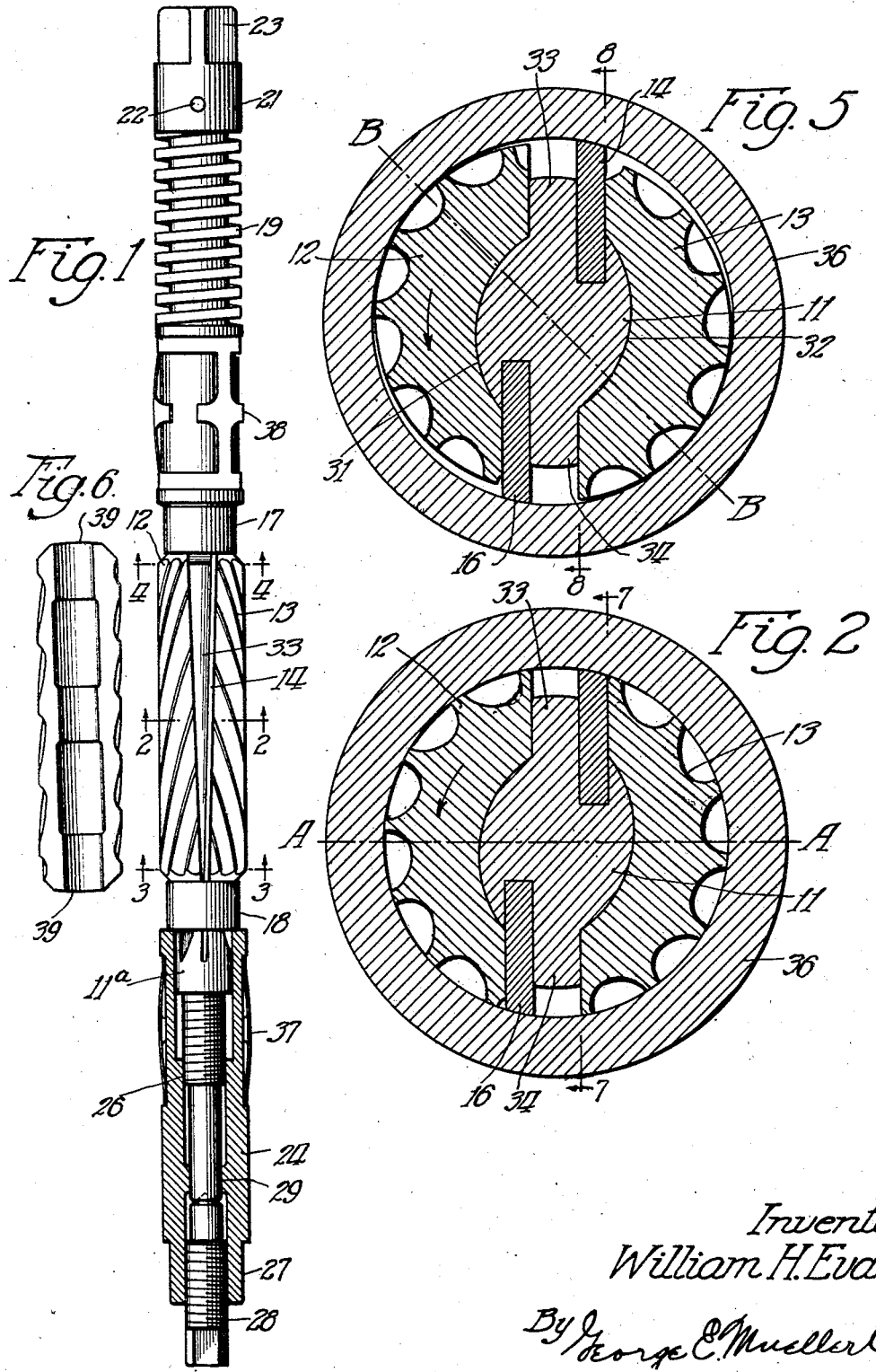
Inventor
William H. Evans
By George E. Mueller Atty

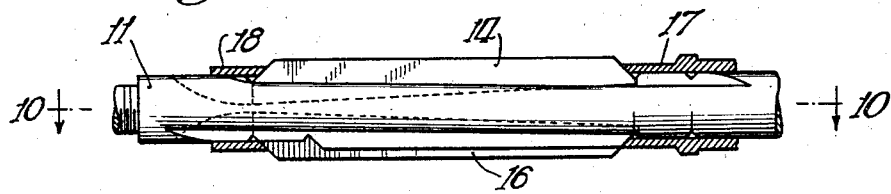
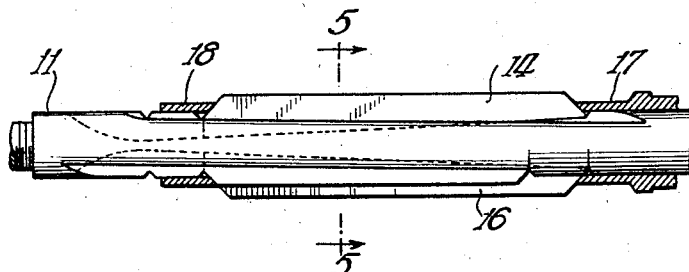
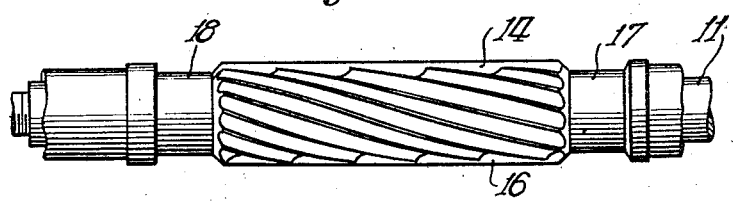
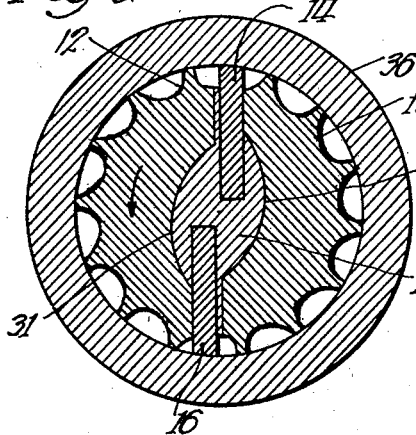
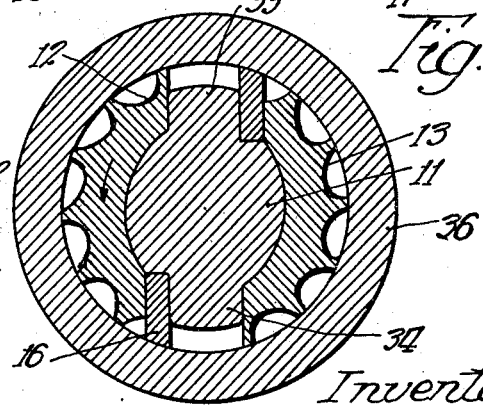

Patented Mar. 21, 1933

1,902,062

UNITED STATES PATENT OFFICE

WILLIAM H. EVANS, OF CHICAGO, ILLINOIS, ASSIGNOR TO EVANS FLEXIBLE REAMER CORPORATION, OF CHICAGO, ILLINOIS, A CORPORATION OF ILLINOIS

EXPANSION REAMER

Application filed November 29, 1929. Serial No. 410,299.

My invention relates, in general, to reamers, and more in particular to reamers of the type known as expansion reamers.

The principal object of my present invention is the provision of an improved expansion reamer.

Another object is the provision of an expansion reamer which will operate equally well and produce a smooth finish on all types of work.

Another object is the provision of a reamer having a long life.

Another object is the provision of a reamer which will cut a truly circular bore under all circumstances.

Other objects and features of the invention will be apparent from a consideration of the following detailed description, taken with the accompanying drawings, wherein—

Fig. 1 is an elevational view, partly in section, of the entire reamer;

Fig. 2 is an enlarged transverse sectional view taken along the line 2—2 of Fig. 1;

Figs. 3 and 4 are similar sectional views taken along the lines 3—3 and 4—4, respectively, of Fig. 1;

Fig. 5 is a sectional view similar to Fig. 2, but with the cutting segments having a different adjustment;

Fig. 6 is a plan view showing the bottom surface of one of the segments;

Fig. 7 is a sectional view taken along the line 7—7 of Fig. 2, and showing the mandrel and guides in elevation;

Fig. 8 is a similar view taken along the line 8—8 of Fig. 5;

Fig. 9 is a fragmentary elevational view showing the reamer fixed at right angles to Fig. 1; and Fig. 10 is a sectional view taken along the line 10—10 of Fig. 7, and showing the sections at right angles to the sections of Fig. 7.

Concerning the general features of my reamer, I employ a center mandrel 11 with a pair of segments 12 and 13, guides 14 and 16, and confining collars 17 and 18, the details of construction of which will be set forth hereinafter.

The segments are designed to be expanded radially to increase the size of the reamer, and the guides are also expanded for the same purpose. I support the segments in such a way that the cutting edges thereof are always behind an imaginary center line cut radially through the axis of the mandrel. This is for the purpose of preventing any tendency of the segments to lift away from the mandrel during a reaming operation. I find that in an adjustable reamer, unless a provision of this character is made, it is practically impossible to support the adjustable cutting members in such a way as to prevent this tendency to pull away from the mandrel and dig into the metal which is being operated on. The result of even a very slight pulling away of the cutting member is, of course, to produce a very inferior bearing or reamed surface. In the present embodiment, I accomplish this result by shifting the segments bodily sideways at the same time that they are expanded.

In order to employ the guides to best advantage, I also design the guides and their support so that they also will expand and simultaneously shift sideways, and so maintain the proper relationship. The cutting surfaces on the segments are arranged so that one cutting surface will move across the cutting path of the other cutting surface and thus prevent grooving or scratching of the reamed surface. I find that even if the cutting surfaces are slightly out of line, a true cylindrical surface is produced without scoring the same, as if the segments had been sharpened true. I consider that this is due to the fact that only two surfaces are cutting at one time, but opposite each other, and with the guides between them, there is a natural tendency for the reamer to center itself under all circumstances. I find that if the reaming tool is mounted in a chuck, a perfect reamed surface is produced, even though the chuck may be out of line so as to wabble perceptibly. The result of these features which I have explained is that substantially perfect operation can be obtained on any type of metal.

Now, with further reference, first, to the tool as a whole, the confining collar 17 is of elongated construction and has one end bearing against a retaining spring 19, the opposite end of the spring bearing against a stop sleeve 21, secured to the mandrel by a pin 22, with the end of the sleeve 23 formed to receive a wrench or other tool. The collar 18 is engaged by an adjusting sleeve 24, which has internal threads for engaging a threaded portion 26 of the mandrel. The outer end of the sleeve 24 is shaped at 27 to receive a wrench and threads are provided in the portion 27 for receiving a lock-screw 28. These threads are of a left-hand type so that the lock-screw 28 may be forced against the end of the mandrel 29 to prevent the sleeve 24 from turning thereon.

In centering the nut 24, I provide two bearing surfaces therefor, one on an extension 11a of the mandrel adjacent the confining collar 18, and the other against the smooth end of the mandrel 29, an unthreaded portion of the inside of the nut 24 bearing against this portion of the mandrel. In this way, I am able to make the threads between the mandrel and nut 24 relatively loose so that the nut can be turned freely, while at the same time being positively centered by engagement at the two places indicated. An exact centering of the confining collar 17 is obtained because this collar sets snugly throughout its length against the upper unthreaded portion of the mandrel.

Now, as to the specific support for the cutting segments, such support, as previously set out, is designed so that a compound adjusting movement is imparted thereto. Consider now Figs. 7 and 10. At opposite sides of the mandrel, oval segment supporting surfaces 31 and 32 are provided, corresponding with similar surfaces on the bottom of the segments. As Fig. 10 shows, these surfaces slant upwardly or away from the axis of the mandrel in a direction toward the collar 17. As Fig. 7 shows, these surfaces also slant at a side angle to the axis of the mandrel. In other words, the supporting surfaces slant away from the axis in one plane, and across the axis in the opposite plane. The segments 12 and 13 have their reverse sides shaped to cooperate with the surfaces 31 and 32 to maintain the cutting edges parallel with the axis of the mandrel while receiving a compound adjustment movement. As the nut 24 is tightened, for example, the collar 18 is forced against the beveled ends of the segments, carrying the segments with it and driving them upwardly on the surfaces 31 and 32. This movement is against the tension of the spring 19 so that, to adjust the reamer, it is simply necessary to operate the nut 24. If the reamer is to be made smaller, this expansion nut is simply released slightly and the spring will force the return of the segments. At the same time that the segments are being expanded, they move sideways as they advance along the supporting surfaces. Looking at Fig. 7, and comparing it with the surface on the reverse side of the segment, as shown in Fig. 6, it is obvious that the segment will shift bodily sideways while still maintaining a perfect alignment for cutting. The purpose and advantages of this feature will be explained more in detail hereinafter.

At the front or leading edge of each segment, guides 14 and 16 are provided. These guides lie in slots in the mandrel, having gradually expanding bottom surfaces, and the guides themselves are also tapered to correspond with this bottom bearing surface, and consequently, as the guides are forced along with the segments, they also expand in the same way as the segments, and so maintain substantially the same adjustment or distance away from the axis of the mandrel. Between the guides and segments, there are wedge-shaped projections, or stop shoulders, 33 and 34, formed integral with the mandrel. These projections serve several useful purposes. Their principal advantage is that the segments are held against any possible rotation by bearing against them. In other words, they act as shoulders or stops for the segments. They determine the position of the segment supporting surfaces, and the guide supporting grooves or slots, which slots are, therefore, slanted in a direction away from the sideways slant of the segment supporting surfaces. The result is that when the segments shift bodily sideways, the guides also have a similar side movement and this has an advantage in securing the best operation of the reamer.

In order better to explain the operation of the reamer, I show in Figs. 2 to 5, inclusive, a bushing 36, or similar member, in which a reaming operation might be performed. Fig. 2 shows the position of the parts when the minimum or smallest diameter of the reamer is being used. Fig. 5 shows the parts where the maximum diameter of the reamer is being employed. I construct the reamer preferably so that, with the minimum diameter, the reamer is cutting in line with the dotted line A—A. This bisects the segments so that the cutting takes place at a point exactly between the two outside edges. With the reamer having its greatest expansion, the cutting edges of the segments are along the line B—B,—that is, midway between the line A—A and the trailing edge of the segments. The segments, therefore, cut at directly opposite places and bear on two points against the work 36. At no time can the ends of the cutting edges come in contact with the work in such a way as to cause a scratching or scoring thereof. The moving of the cutting line from the center of the segment gradually backward as the reamer is expanded, keeps the cutting edge always behind a center line drawn through the axis of the mandrel and so prevents any tendency of the segments to lift up. As a matter of fact, the tendency is just the reverse, and even without rigid support at the ends of the segments by the confining collars 17 and 18, the segments will be held tightly against the supporting surfaces, including the members 33 and 34. Due to this construction and mode of operation, I am able to design the cutting edges on the segments so that one cuts across the path of the other at an angle, and so prevents the possibility of going over the same path and causing a scoring or uneven cutting of the surface. I prefer the use of right-hand convolutions on one segment and left-hand convolutions on the other. I may, however, secure substantially this same result by simply making the convolutions of one segment run at a different angle than the convolutions on the other.

By employing a new type of construction utilizing novel principles, I am enabled to use a very much harder cutting edge than has been possible in reamers of this type heretofore, and so obtain extra long life and unusually good performance. I manufacture the segments from a mild grade of steel and then pack-harden them so that a glass hard cutting edge is obtained. Since there is no tendency for the cutting edges to dig into the surfaces which are being reamed, chipping of the cutting edges is avoided. This is also remedied in great part by the fact that the very hard edge is backed by a relatively softer material, which imparts to the tool, as a whole, greater toughness than could be obtained with the usual tool steel. With the reamer of my invention, I can operate on all types of metal, including hard grades of steel, case iron, copper, aluminum, and the like.

The reamer of my invention is employed in substantially the same way as other reamers, the end 23 being engaged by a suitable tool, and the reamer rotated in a clockwise direction. Guides 37 and 38, made of spring steel, are provided for assisting in the centering of the reamer. These guides expand in such a way within an opening as to center the front or rear end of the tool, as the case may be. The segments themselves, with the guides, center this portion of the tool with no possibility of getting out of alignment.

As the drawings show, the ends of the segments are beveled to fit under the collars 17 and 18. However, in order to allow for side movement of the segments, I make the ends thereof slightly rounded as at 39 (Fig. 6). This permits the segments to shift readily and avoids the possibility of a corner being wedged in under the collar, as might take place if these segments were cut square across the end.

Attention is called to the fact that the tension of the spring 19 is not adjustable, which is a feature differing from other reamers which employ a spring of this character. This means that through the entire adjustment of the reamer, it is simply necessary to adjust from one end, and whether the spring 19 is offering a small amount of tension or a large amount of tension, the segments will not expand when the reamer is being used.

The arrangement for adjusting the reamer to size is very satisfactory and efficient. Assume that the member 21 is held in a check and the reamer is being turned and the operator wishes to enlarge the diameter of the reamer. While it is turning, he may engage the lock nut 28 and allow the turning of the reamer to loosen it a fraction of a turn, or a number of turns, as desired. Then, by engaging the portion 27 of the nut 24, the turning of the reamer will tighten the nut 24 until the end of the mandrel is again engaged by the lock nut. The expansion then will be equal to the amount the lock nut has previously been loosened.

While I am able to secure the best results with my reamer by employing the combination of all of the novel features set out, the construction may be modified considerably and good results obtained by using only some of these features. By using two segments rather than any other number, the reamer automatically lines up to produce a truly circular cut without scoring, because it is cutting only on two points at any one time and these points are directly opposite each other. This feature can be used without the guides, but I find the guides of considerable assistance when working on certain types of metals. Having the convolutions reversed on the two segments, is also advantageous, because one cuts across the other and prevents scoring. When any considerable portion of the reamer is in engagement with the work, the reamer will line itself up because the cutting surfaces engage from end to end of the segments. When the cutting edges, however, are just beginning to enter, the spring 37 is of great assistance in maintaining perfect alignment, without the use of any other guiding means.

While I have described the details of construction and operation of my reamer, to enable those skilled in the art to make and use the same, I am not restricted to all of the features shown and described, but the invention is limited only by the scope of the appended claims.

What I claim as new and desire to protect by Letters Patent of the United States is:—

1. A reamer of the character described including a mandrel with a pair of supporting surfaces inclined to the axis of the mandrel in a radial place and at an angle to the axis in a chordal plane, a pair of segments with spiral cutting teeth, bottom surfaces corresponding to said supporting surfaces, and bevelled ends, retaining collars, one at each end of the segments adapted to fit over the bevelled ends of the segments, a spring bearing against one collar, and an adjusting nut bearing against the other collar, the adjusting nut being so disposed with respect to the segments and their supporting surfaces that tightening thereof expands the segments and moves them bodily sidewise away from the direction of movement of the reamer when cutting.

2. A reamer of the character described including a mandrel having supporting surfaces inclined to the axis of the mandrel in a radial plane, and at an angle to the axis in a chordal plane, cutting segments having inner surfaces shaped to correspond to such supporting surfaces, and outer surfaces formed into a plurality of spaced cutting edges lying in a true cylinder at the smallest diameter, means for supporting said segments against said surfaces, and means for advancing said segments along said surfaces to increase the diameter of the reamer and shift the segments laterally in a direction opposite to the direction of rotation of the reamer when cutting, whereby the cutting portion of the segments is shifted toward the trailing edges thereof.

3. An expansion reamer comprising two semi-cylindrical segments provided with a plurality of spirally arranged cutting edges over substantially the entire periphery thereof, and a mandrel slidably supporting the segments, said mandrel having a pair of rounded surfaces each inclined outwardly and laterally and the segments having correspondingly shaped bottom surfaces so that shifting the segments along the mandrel surfaces moves them radially outwardly and laterally in a direction opposite to the normal direction of rotation of the reamer, whereby the cutting zone of the segments is transferred from the middle section thereof toward the trailing edge of the segments as the reamer is expanded.

4. A reamer of the character described including a mandrel having supporting surfaces inclined to the axis of the mandrel in a radial plane, and at an angle to the axis in the choral plane, cutting segments having inner surfaces shaped to correspond to such supporting surfaces, and outer surfaces formed into a plurality of spaced cutting edges lying in a true cylinder at the smallest diameter, means for supporting said segments against said surfaces, means for advancing said segments along said surfaces to increase the diameter of the reamer and shift the segments laterally in a direction opposite to the direction of rotation of the reamer when cutting, whereby the cutting portion of the segments is shifted toward the trailing edges thereof, and shoulders on the mandrel engaging and supporting the trailing edges of the segments.

5. A reamer of the character described including a mandrel having supporting surfaces inclined to the axis of the mandrel in a radial plane, and at an angle to the axis in the chordal plane, cutting segments having inner surfaces shaped to correspond to such supporting surfaces, and outer surfaces formed into a plurality of spaced cutting edges lying in a true cylinder at the smallest diameter, means for supporting said segments against said surfaces, means for advancing said segments along said surfaces to increase the diameter of the reamer and shift the segments laterally in a direction opposite to the direction of rotation of the reamer when cutting, whereby the cutting portion of the segments is shifted toward the trailing edges thereof, shoulders on the mandrel engaging and supporting the trailing edges of the segments, guide members, one for each segment, lying between said shoulders and the leading edges of the segments, and means for expanding the guide members as an incident to the expansion of the segments.

In witness whereof, I hereunto subscribe my name this 25th day of November, 1929.

WILLIAM H. EVANS.